(No Model.) 9 Sheets—Sheet 1.
A. BARCLAY & J. WALKER.
PNEUMATIC GRAIN CONVEYER.
No. 424,638. Patented Apr. 1, 1890.
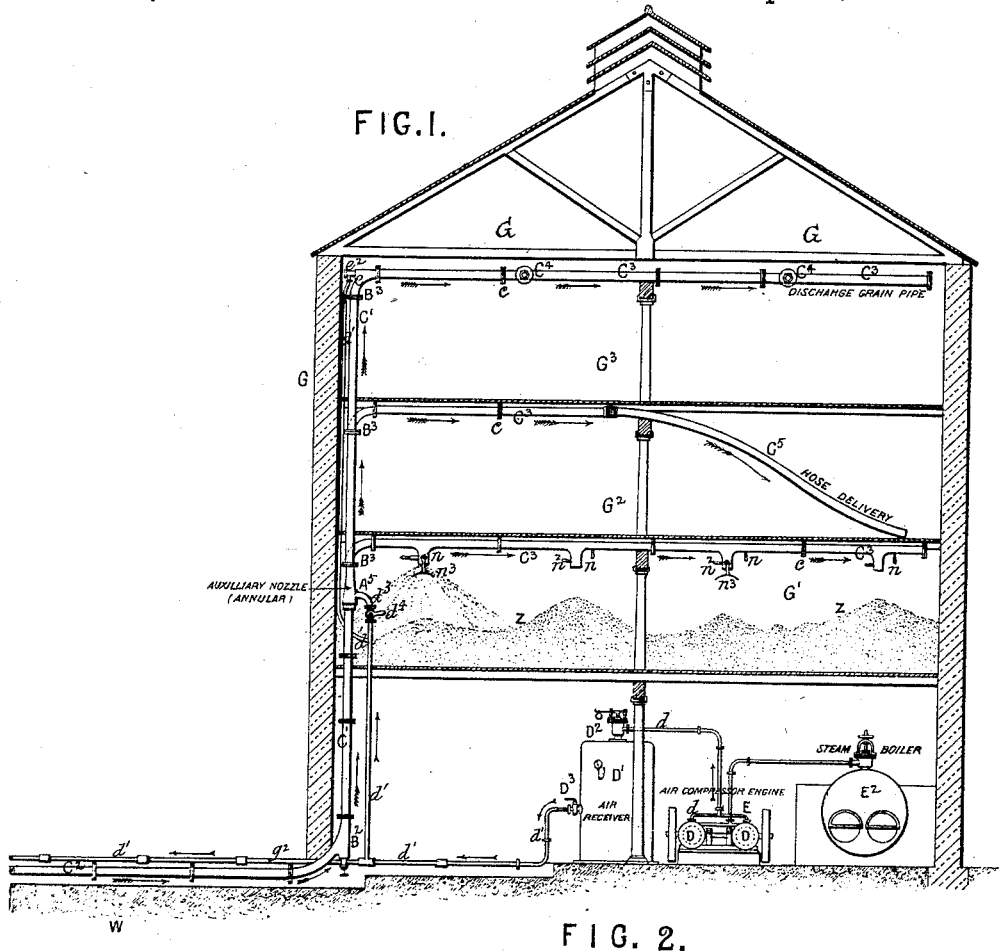
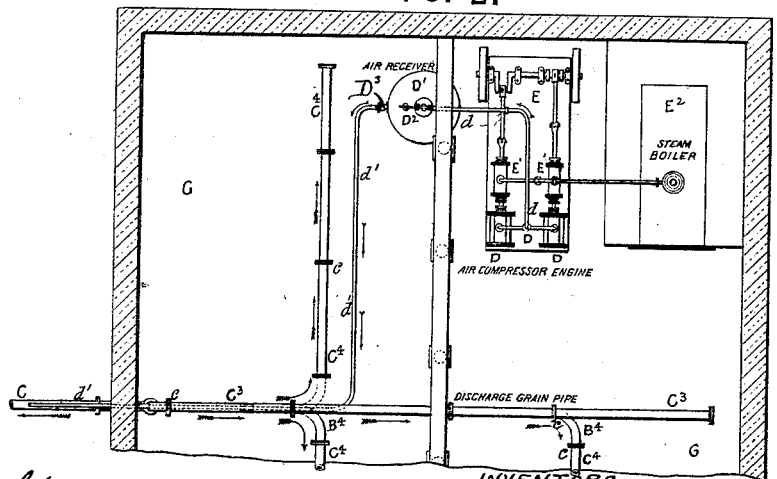

(No Model.) 9 Sheets—Sheet 2.
A. BARCLAY & J. WALKER.
PNEUMATIC GRAIN CONVEYER.
No. 424,638. Patented Apr. 1, 1890.
FIG. 1.ᴬ
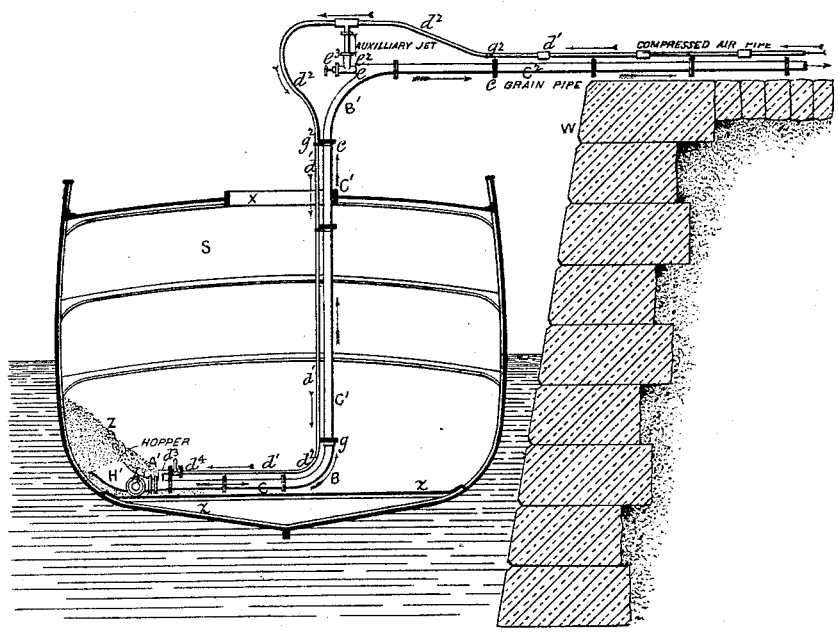

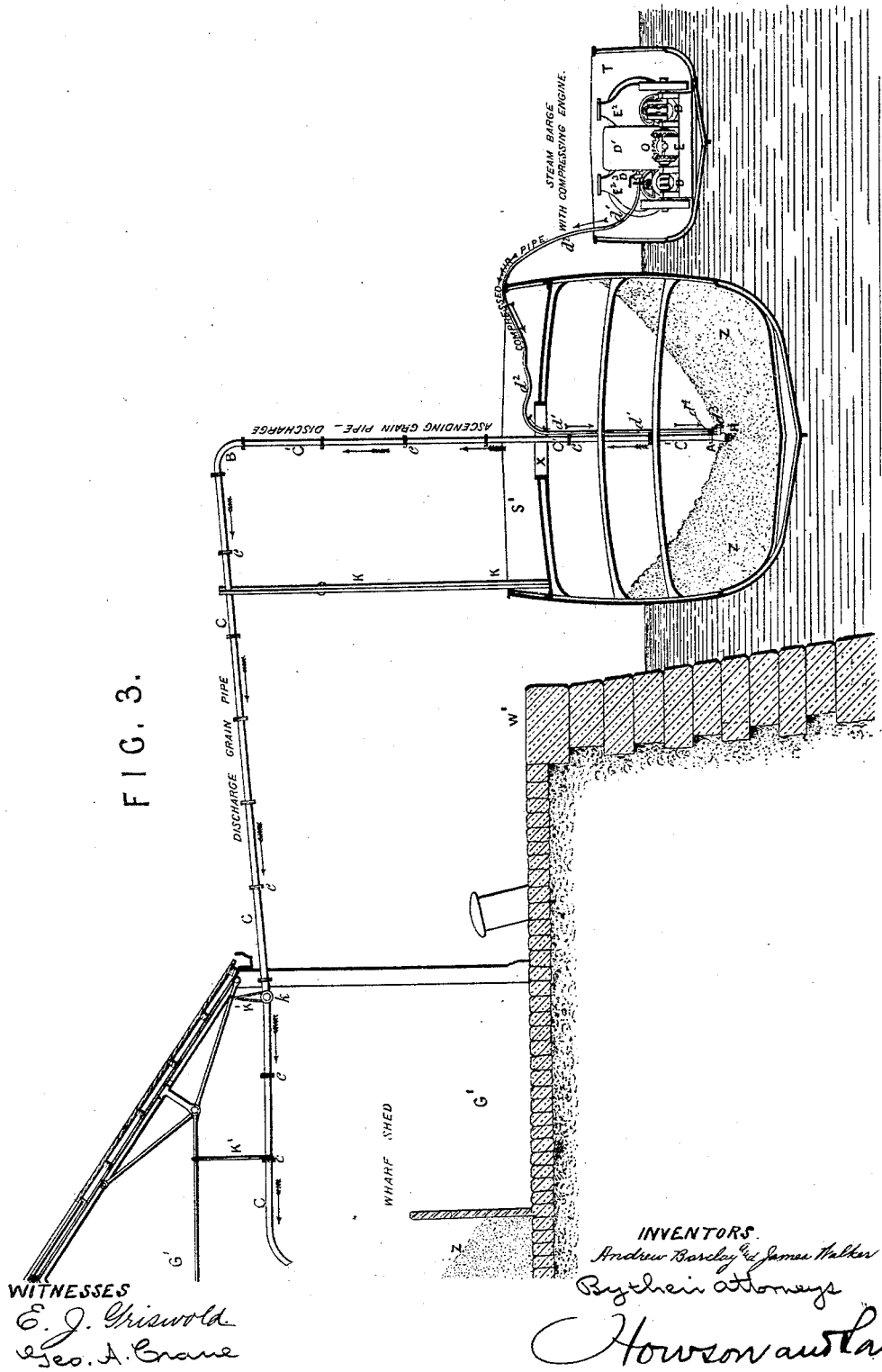

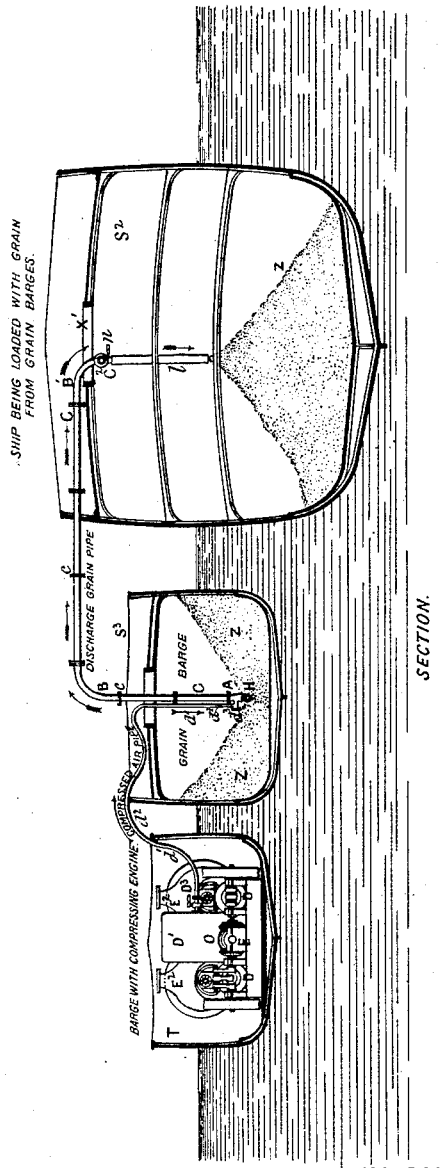

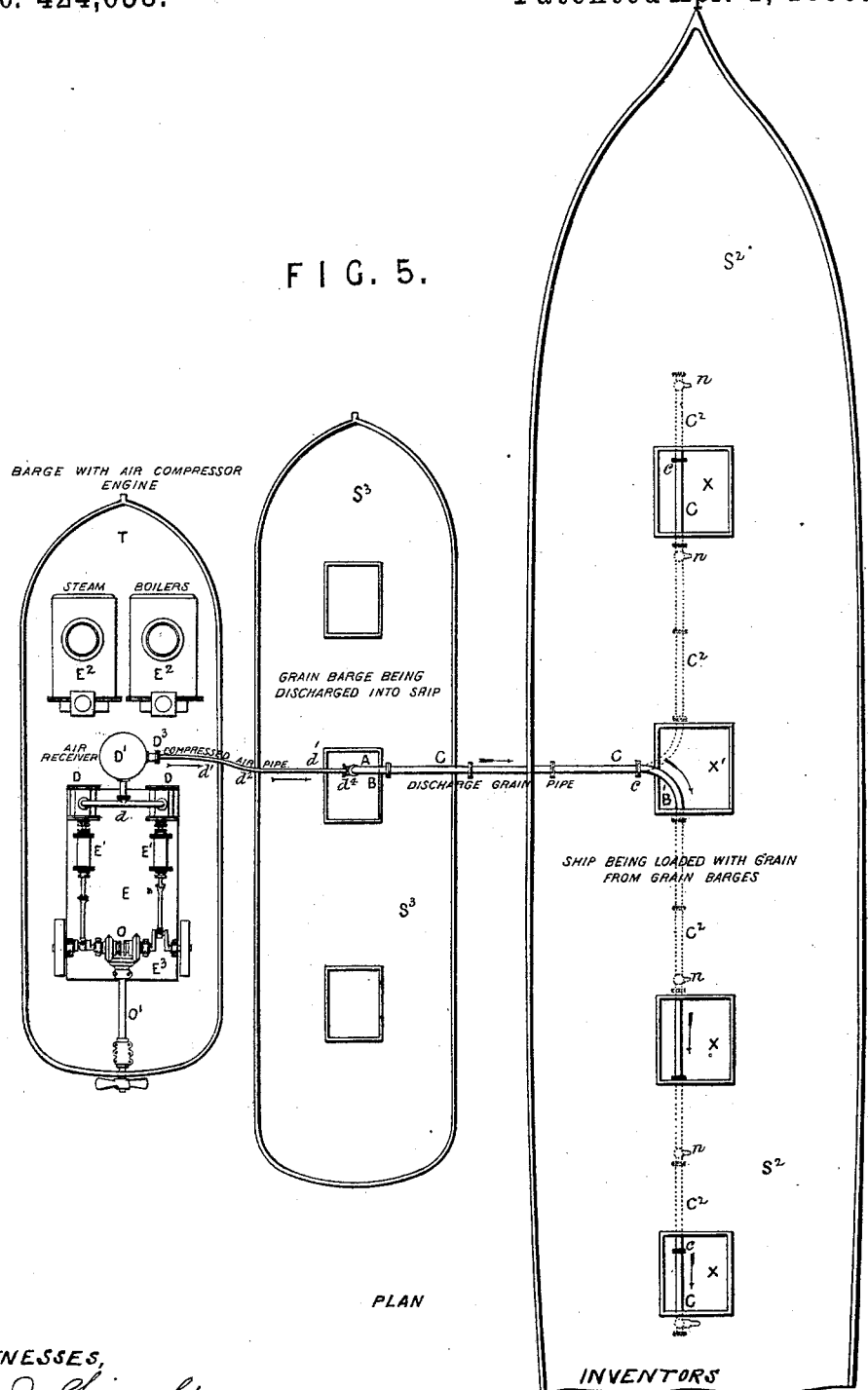

(No Model.) 9 Sheets—Sheet 6.

A. BARCLAY & J. WALKER.
PNEUMATIC GRAIN CONVEYER.

No. 424,638. Patented Apr. 1, 1890.

WITNESSES
E. J. Griswold.
Geo. A. Crane

INVENTORS
Andrew Barclay & James Walker
By their Attorneys
Howson and Sons (No Model.) 9 Sheets—Sheet 7.
A. BARCLAY & J. WALKER.
PNEUMATIC GRAIN CONVEYER.
No. 424,638. Patented Apr. 1, 1890.
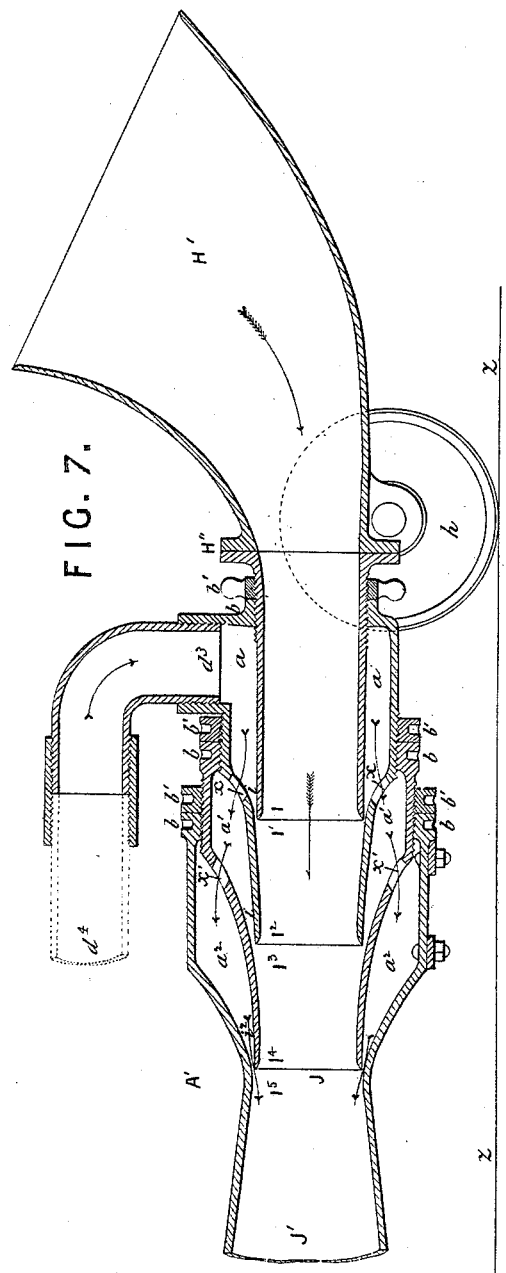
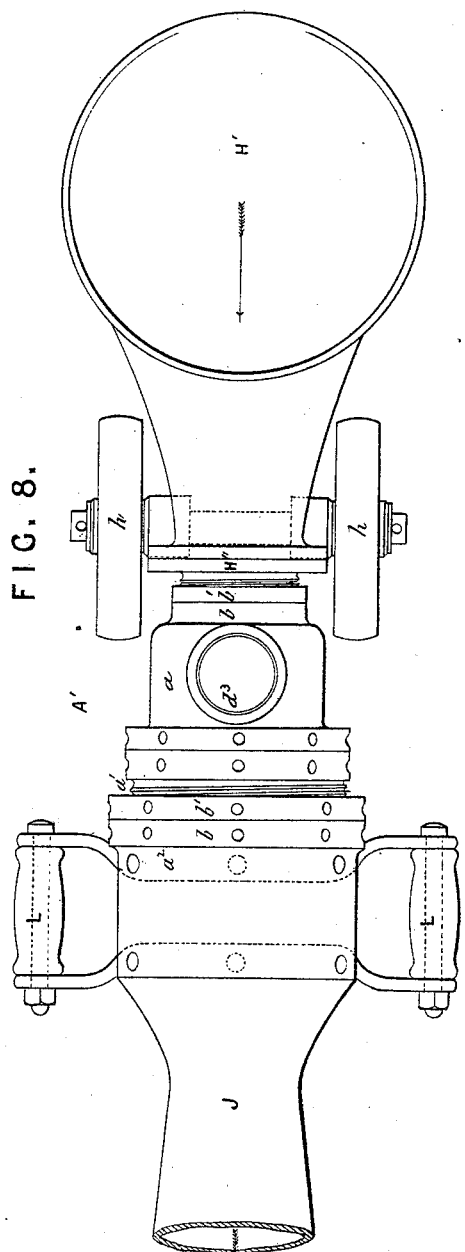
WITNESSES
E. J. Griswold
Geo. A. Crane.
INVENTORS
Andrew Barclay & James Walker
By their attorneys
Howson and Sons

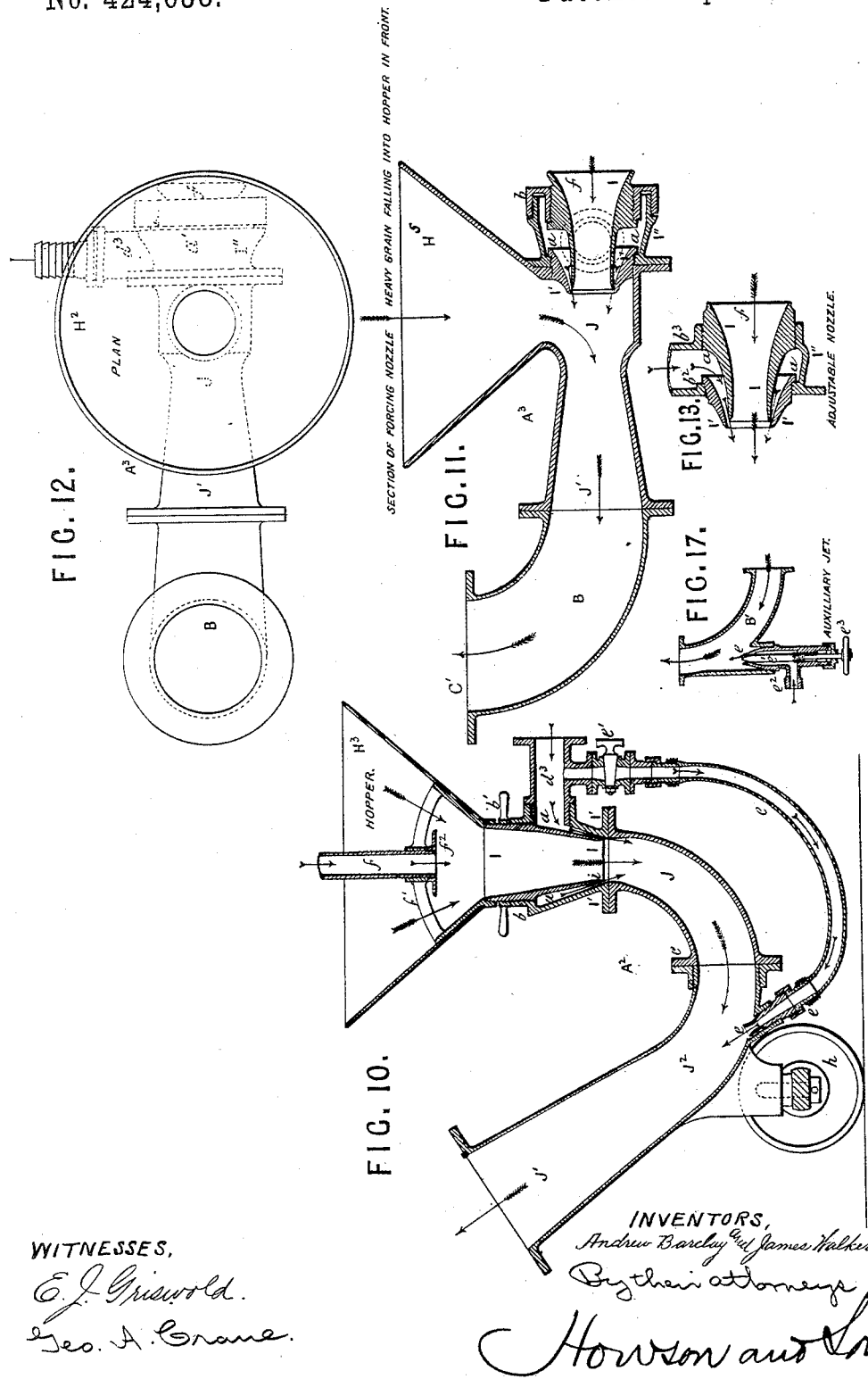

(No Model.) 9 Sheets—Sheet 9.
A. BARCLAY & J. WALKER.
PNEUMATIC GRAIN CONVEYER.
No. 424,638. Patented Apr. 1, 1890.
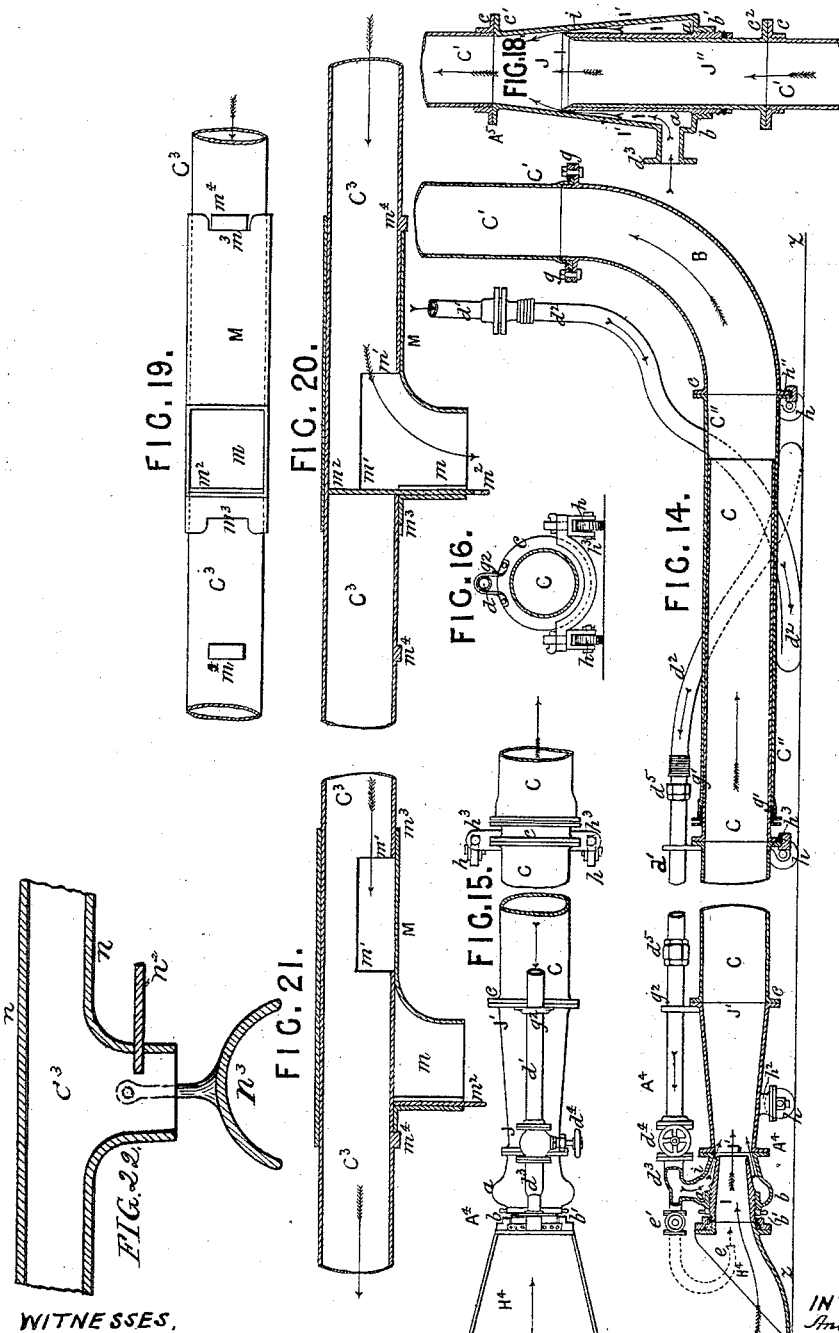
WITNESSES.
E. J. Griswold.
Geo. A. Crane.
INVENTORS,
Andrew Barclay
James Walker
By their Attorneys
Howson and Sons

UNITED STATES PATENT OFFICE.

ANDREW BARCLAY, OF KILMARNOCK, COUNTY OF AYR, AND JAMES WALKER, OF GLASGOW, COUNTY OF LANARK, SCOTLAND.

PNEUMATIC GRAIN-CONVEYER.

SPECIFICATION forming part of Letters Patent No. 424,638, dated April 1, 1890.

Application filed March 26, 1887. Serial No. 232,549. (No model.) Patented in England January 26, 1886, No. 1,123.

*To all whom it may concern:*

Be it known that we, ANDREW BARCLAY and JAMES WALKER, both subjects of the Queen of Great Britain and Ireland, and residing, respectively, at Kilmarnock, Ayrshire, and Glasgow, Lanarkshire, Scotland, have invented certain Improvements in Pneumatic Grain-Conveyers, (for which we have obtained British Patent No. 1,123, dated January 26, 1886,) of which the following is a specification.

This invention has reference to the lifting, elevating, transmitting, or conveying and depositing of loose grain—such as corn, wheat, barley, rice, or other seeds or like granular materials generally transported in bulk—by the use of forced currents of air in small pipes to and through large closed pipes, hose, or conduits, through which the granular material is carried with the air, and specially to improved constructions of the suction and forcing nozzles, and to improved arrangements and combinations of these nozzles and the pipes and conduits and other parts of the apparatus, which improvements will be much more convenient and efficient in their action and more generally applicable than means heretofore employed for removing, elevating, and conveying grain and like materials.

Figure 6:
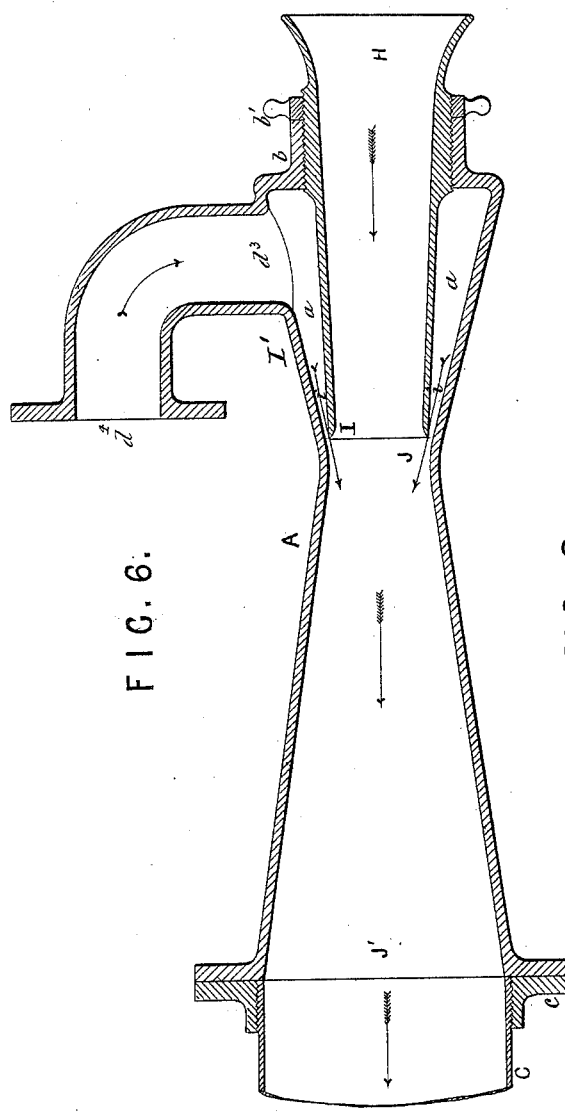
Figure 9:
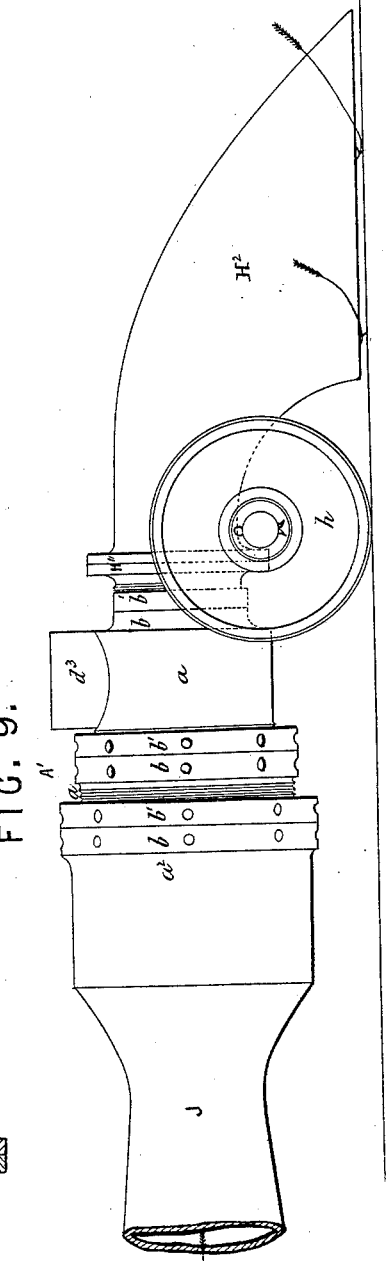

Figure 1 in the accompanying drawings shows a transverse sectional elevation of a granary or grain-store G, adjacent to a wharf W, for unloading the grain Z from ships and other vessels; and Fig. 1$^A$ shows a transverse section of the hull S of a grain-ship at wharf W, shown as in the act of being unloaded and discharged into the grain-store G, all fitted with one construction or general arrangement of our improvements of grain elevating and conveying or transmitting mechanism, as arranged and suitable for granaries. Fig. 2 is a partial plan of the under part of the granary G with the building in section corresponding to Fig. 1, showing a stationary or permanent arrangement of air-forcing engine and mechanism and grain conducting and conveying pipes or conduits. Fig. 3 shows a transverse section of a harbor-wharf W′ and grain-shed G′ with grain-ship S′ as in the act of having the grain discharged from it into the shed G′ by a portable arrangement of air-forcing engine and grain elevating and conveying appliances, the air-forcing engines and machinery being erected and carried in a float, steamboat, or ship T for the purpose. Fig. 4 shows a transverse section of a grain-ship S$^2$ in the act of being loaded with grain from a grain-barge S$^3$ by an arrangement of these improvements as applied thereto, the air-forcing engines and machinery being carried on a floating tender or steamboat T. Fig. 5 is a corresponding plan to Fig. 4. The arrows in all these figures indicate the direction of the motion of the grain in the grain-transmitting pipes or conduits B B′ B$^2$ C C′ C$^2$, while darts indicate the direction and motion of the air in the air-forcing pipes $d$ $d'$ $d^2$ $d^3$, leading to the grain induction and forcing apparatus A to A$^4$. Fig. 6, Sheet 6, is a sectional view, drawn to an enlarged scale, of one form of our improved grain induction and forcing apparatus. Fig. 7, Sheet 7, is a vertical section, and Fig. 8 a plan view, of another form of this apparatus. Fig. 9, Sheet 6, is a side elevation of a modification of that shown in Fig. 7. Fig. 10, Sheet 8, is a vertical section of another modification. Fig. 11 is a vertical section, and Fig. 12 is a plan view, of another modification. Fig. 13 is a sectional view of a modified form of part of the device, Fig. 11. Fig. 14, Sheet 9, is a vertical section, Fig. 15 a plan, and Fig. 16 a transverse section, of another modification of our apparatus. Fig. 17, Sheet 8, is a vertical section of a detail which may be employed in connection with and as a part of our apparatus. Fig. 18, Sheet 9, is a vertical section of another modification. Fig. 19 is an inverted plan, and Figs. 20 and 21 vertical sections, with the parts in different positions, of a detail in the conveying-pipes; and Fig. 22 is a vertical section of another detail at a distributing-point.

The modification A of the improved grain induction and forcing apparatus shown in Fig. 6 is shown also at A in the general views on Sheets 3, 4, and 5 specially adapted for use with the higher pressures of air. This arrangement consists of an annular air-jet nozzle I I′, fitted with the discharge-trumpet J J′, which tapers outward from the annular air-jet opening $i$, and is secured at its wide end to the first length of pipe of the main grain-conduits C at c. The inner nozzle I of this arrangement for the passage of the grain is made tapering down to the opening i, and is preferably screwed into a deep threaded socket b at the extreme end of the air-chamber a of the outer nozzle or casing I', and fitted with a jam-nut b' for regulating the opening i from the chamber a. The air enters this chamber from the branch $d^3$, and is led from the air-pressure pipes d', as is indicated by the darts and arrows in Sheets 1 to 5.

The outer end H of the nozzle I is shown as made flaring or in the form of a trumpet for admitting the grain Z to this apparatus, which may be placed or hung direct onto the grain to be raised, either vertically, horizontally, or at an angle; but when preferred this end H might be made larger and of various shapes, and be attached by flanges, as at H'' in Figs. 7, 8, and 9, to the entering end of the nozzle I. This arrangement of grain induction and forcing apparatus (shown in Fig. 6, and at A in the general arrangements, Figs. 3 to 5, with one annular air-jet nozzle I I' only) is more particularly applicable for the use of the higher pressures of air, as from ten to forty pounds of pressure per square inch, for inducing and raising the grain Z by producing a partial vacuum in the nozzle I, or producing a suction in the pipes or hose below or beyond this end of the nozzle I instead of the trumpet H.

Figs. 7 and 8 show a vertical section and plan, respectively, of another modification of grain induction and forcing apparatus, as indicated at A' in the general arrangement, Fig. 1$^A$, more particularly suitable for the lower pressures of air by the use of two, three, or more sets of annular air-jet nozzles I I', and I$^2$ I$^3$ and I$^4$ I$^5$, in which the grain Z in a great measure falls into the apparatus by gravitation and requires less pressure of air to produce the suction and force necessary to give the velocity and force to the grain to raise it through the pipes B C. In this arrangement the feeding grain-admission trumpet H' is bolted by flanges H'' to the rear end of the first or inner nozzle I, and between this nozzle and the throat J of the discharge-trumpet J' two other sets of annular air-jet nozzles I$^2$ I$^3$ and I$^4$ I$^5$ are fitted with two other extra air-chambers $a'$ $a^2$ in communication with the first air-chamber a through openings x x'. Into the chamber a opens the pressure-air branch $d^3$, and these nozzles are severally screwed into each other with jam-nuts at b b', as in Fig. 6, for the regulation of the annular air-jet issuing at i i' i$^2$, respectively. A controlling-tap would be fitted to each of these branches $d^3$ to regulate the admission of air and control the working of the apparatus. This arrangement of apparatus (shown in Figs. 7 and 8) is more particularly applicable for being attached to a horizontal range of pipes B C, as seen in Fig. 1$^A$, for working on a level floor, as at z, for receiving the grain or other granular substance Z to be elevated from the bulk in ship-holds, or it might be from bins in sheds falling to the trumpet H', and in this way this apparatus is preferably mounted on small bogie or other wheels h, either to move longitudinally or laterally for the convenience of being moved about up to the grain, and might have handles attached to it, as at L, for the purpose.

Fig. 9 shows a vertical elevation of a grain induction and forcing apparatus, like that in Figs. 7 and 8, except that it has its grain-admission trumpet H$^2$ inverted, so that its mouth takes down near to the level of the floor z to draw up the grain off the floor to clean up the whole automatically.

Fig. 10 is a vertical sectional elevation of another construction of grain induction and forcing apparatus A$^2$ as suitable for the grain Z or other granular material falling into it by gravitation to be elevated direct up through a knee pipe or bend J$^2$ close to the apparatus. When desired, it may have a supplementary air-jet nozzle e and regulating-tap e', connected to the branch $d^3$, supplying the air to the annular air-jet nozzle I I' of this apparatus, to assist in elevating the grain up the rising main pipes B C at the bend J$^2$ of the delivery-trumpet J J'. In this arrangement A$^2$ the annular air-jet nozzle I I' is somewhat analogous in construction to that shown in Fig. 6, but inverted, with a lateral air branch $d^3$, conducting the pressure of air to the chamber a of the outer nozzle I' to give the annular jet of air at i into the throat of the kneed trumpet to force the grain Z up the main elevating-pipes B C, as shown in the general arrangements, Sheets 1 to 5. The grain in this arrangement is admitted to the nozzle I from a large trumpet or hopper H$^3$, mounted on it, and the grain would be fed by spouts from a higher level, or it might be from elevators. This hopper is shown provided with an air-tube f, carried in the eye of cross-arms at f' over the entrance of the hopper H$^3$ to the nozzle I. The tube f has flanges f$^2$ at its outer end, and is threaded into the eye of the arms f', so that by screwing it can be adjusted up or down to increase or decrease the size of the opening for the admission of grain, and so regulate the quantity which shall fall into the nozzle apparatus to be raised by the annular jet of air issuing at i i. The air-pipe f might have a tap on it for regulating the admission of the outer atmospheric air above the grain to assist its induction into the apparatus.

Fig. 11 shows a vertical sectional elevation, and Fig. 12 is a corresponding plan of a grain induction and forcing apparatus A$^3$ somewhat different from that shown in Fig. 10. In this the hopper H$^5$ conducts the grain to fall by its gravitation at right angles into the annular air-jet nozzles I I', while the annular jet of air at i from an air-chamber a forces the grain out through the trumpet J J' up the bent pipe B into the rising main pipes above at C′, otherwise substantially as in the other modifications. In this arrangement, however, the inner nozzle I is used as an air-conducting nozzle for assisting the forcing effect of the grain through the throat J of the trumpet, as at $f$, in the former arrangement, Fig. 10; but the grain or granular substances might also be admitted with this air when the nozzle is made as large as shown in these figures. This arrangement also admits of various-sized nozzles I I′ being screwed into the casing I″ of the air-chamber $a$, as indicated in section in Fig. 13 and threaded at $b^2$ $b^3$, so as to permit of the regulation of the size of opening $i$ for the annular jet of air. Although this arrangement is shown with a knee at B for raising the grain through vertical pipes at C′, it might be fitted to straight pipes C to force the air straight along in the direction of the trumpet J J′ when this was required before raising or elevating the grain.

Figs. 14 and 15 show a vertical sectional elevation and plan, respectively, of a grain inducing and forcing apparatus $A^4$ and range of pipes somewhat analogous to that shown at A′, Figs. 1ª and 7, but with one annular air-jet nozzle I I′ and air-chamber $a$, as in Fig. 6, as suitable for transmitting the grain with one annular jet of high-pressure air at $i$ with a shovel-shaped scoop $H^4$ for raising and feeding the grain from any level floor $z$, as that of a ship's hold. An auxiliary jet of air may be used or not, as indicated by dotted lines at $e$ $e′$, from the branch $d^3$ of the air-pipes $d′$, to assist in feeding forward the grain through the inner nozzle I to the annular jet at $i$ in the throat J of the induction-trumpet J J′ for forcing the grain into the first length of horizontal pipe C. These pipes C might be made of any desired length by adding a new length of pipe as the apparatus $A^4$ is required to be fed forward to the grain Z in the hold of the ship, and this range of pipes C C C would be fitted with bogie or other wheels $h$ in front at $h^2$ and with small wheel-trucks, as indicated at $h^3$, Fig. 16, for being put under the flanges of the pipes C to enable the apparatus and pipes to be moved longitudinally and transversely on the wheels $h$ along the floor $z$ of the ship up to the face of the grain Z to be elevated and discharged from the ship. To assist in this longitudinal and transverse motion of the grain-pipes C, the rising bend or knee-pipe B, leading to the vertical rising main pipe C′, would be formed with a swivel-connection $g$ with the bend B to give the lateral motion, and for permitting the longitudinal motion the first horizontal pipe at C″ next the rising knee bend B would preferably be formed slightly larger than the pipes C, with a simple stuffing-box $g′$ at its outer end, so as to allow one end of this pipe C to move telescopically to and fro in the pipe C″, so that as the nozzle apparatus $A^4$ and pipe C were carried forward to the extent of one length of piping C a new length of piping could be quickly inserted and the external telescopic pipe at C″ carried back again for working the apparatus forward longitudinally, as for the first length of pipe C. This arrangement of moving the large metal grain-conveying pipes C at the bends B is preferred to having hose at these bends, which are not easily made large and flexible with smooth internal surfaces; but when these could be obtained they might be used instead of the rigid swiveled bends B $g$ and telescopic jointed pipes C C″. However, for the small air-forcing pipes $d′$ at these movable parts hose $d^2$ would preferably be employed, as shown in Fig. 14, and a new length of small metallic air-piping $d′$ would be added and coupled, as at $d^5$, for every length of the large grain-transmitting pipes C added, and these pipes $d′$ might be carried by straps at $g^2$, attached to the flanges $c$ of the pipes C, either over or along the sides of these pipes C, as found most convenient. A stop or regulating valve $d^4$ is shown for regulating or turning on or off the pressure of air from these pipes $d′$ to the branch $d^3$ of the nozzle apparatus $A^4$, Figs. 14 and 15, and which would be fitted on all the other nozzle apparatus A to $A^4$.

Fig. 17 shows a sectional elevation of a bend or knee grain-conveying pipe B, as fitted with an auxiliary jet-nozzle $e$, with lateral branch $e^2$, leading the air from the air-pressure pipes $d′$ to it, and fitted with a screw-spindle $e′$ and hand-wheel $e^3$ for regulating and shutting off or on this jet of air to increase the velocity of the current of grain and air through the pipes at these bends, either to the rising main pipe C′ or to horizontal ranges of these pipes C, as indicated at the bends B′ $B^2$ $B^3$ in the general arrangement, Figs. 1 and 1ª.

Fig. 18 shows a vertical section of an auxiliary induction and forcing apparatus $A^5$ for surrounding and leading into the full-sized main grain-pipes C′ and being fitted in between the flanges $c$ of these at any part of the rising main, as indicated at $A^5$ in the general arrangement, Fig. 1; or it might be in the long ranges of horizontal pipes C, where auxiliary jets are required in these to increase the velocity of the grain and air-current passing through them. The apparatus consists in this arrangement of a short outer case I′, with an air-chamber $a$ and lateral air branch $d^3$, fitted with a flange $c′$ at its one end for joining to the flange $c$ of the large pipes C′, leading from the apparatus $A^5$, and formed with a screw-socket $b$ and locking-nut $b′$ at the other end. It is provided with an inner nozzle I, sliding on a short internal branch pipe J″, with flange $c^2$ for bolting to the flange $c$ of the pipe C′, leading to the apparatus $A^5$. The nozzle I is screwed on its outer circumference at $b′$ and threaded into the socket $b$, and it has holes at its outer extremity for turning this nozzle I within the chamber $a$ and outer casing or nozzle I′, so as to adjust and give a greater or less annular jet of forced air at $i$, leading into the pipes C to assist and increase the current of grain and air through them as found necessary. The air-pressure pipe leading to the lateral branch $d^3$ would be fitted with a screw closing or regulating tap $d^4$ in Figs. 14 and 15.

Figs. 19 and 20 show a longitudinal elevation and sectional plan, respectively, of one arrangement of the horizontal grain-conveying pipes $C^3$ as suitable for discharging the grain Z at any parts by horizontal branches, as indicated at $m$, along the pipes $C^2$ into the divisions of the flats of a granary; or it might be by equivalent vertical branches $n$ in the pipes $C^3$ in the flat $G'$ of the granary G, as indicated in Fig. 1, Sheet 1. This arrangement (shown in Figs. 19 and 20) consists of a short sliding sleeve branch M, with lateral branch $m$, capable of sliding along the pipe $C^3$, so as to either open or close an opening at $m'$, cut away in the pipe $C^3$ to the branch $m$, and allow the grain to escape from the pipe $C^3$ by the branch $m$ into the granary at the part desired, the branch $m$ being fitted with a sliding shutter $m^2$ for inserting through the opening $m'$ to prevent the grain passing this division and be deflected out laterally, as indicated by the arrows in Fig. 20.

Fig. 21 shows a horizontal section through the pipe $C^3$, at the branch $m$ $m$, corresponding to Figs. 19 and 20, but showing the sleeve branch M as shifted to close the aperture $m'$ in the pipe $C^3$, and with the shutter $M^2$ as drawn out, but with the lower part broken off. Checking-notches $m^3$ are formed on the sleeve M at either end for engaging with stops $m^4$ on the outside of the pipe $C^3$ on either side of the opening $m'$ for securing the branch $m$ in its respective open and shut positions, as shown in Fig. 20.

Referring to the general arrangements, Sheets 1 to 5 of the drawings, we use air compressing or blowing engines E E', preferably with double steam-cylinders E' and corresponding air-cylinders D D. The air-cylinders D would force the air through the pipes $d$ in the accumulator D', from which the compressed air would be led by the pipes $d'$ to the various improved induction and forcing apparatus or appliances A to $A^5$, controlled by a stop-valve $D^3$ at the accumulator D', and by controlling-valves $d^4$ at the branch $d^3$ of the air induction and forcing appliances A to $A^5$. We convey the high-pressure current of air from this vessel D' by small pipes and hose $d'$ $d^2$ (the pipes $d'$ being preferably made of malleable iron and the hose $d^2$ being made of rubber and canvas, as usual for high-pressure steam and water-pressure hose or pipes where movement is required in these air-forcing pipes $d'$) to the various parts of the grain-transmitting conduits B and C, where air-jet nozzles A to $A^5$ are to be fitted to convey the grain through these grain-conveying conduits B C in the various figures, and fitted with suitable lateral branches $d^3$ and regulating valves or taps $d^4$ for attaching these pipes or hose $d'$ $d'$ to.

As shown at A' in Fig. 1ª and in detail, Figs. 7 and 8, one improved construction and arrangement of the grain induction and forcing apparatus for so conveying grain through the said main conducting-pipes B and C consists of a hopper H' of a wide trumpet or scoop shape, and open above and in front to allow the grain Z to fall into it, and preferably made of sheet metal, secured on the end of a rigid induction-nozzle I or pipe leading the grain to this induction and forcing apparatus A'; or it might be to any of the other grain-inducing apparatus shown at A $A^2$ $A^3$ $A^4$ in the other figures. This apparatus would be sufficiently long for an attendant or attendants to carry or move about on wheels $h$ (or otherwise) and be pushed or immersed under or within the grain Z, so that this will flow freely into the said hopper H' and nozzles I of the apparatus A to $A^4$. The wide discharge end J' of the metal pipe or annular air-jet nozzle I I' beyond the throat J is secured to the first length of grain-piping of the main pipes C; or it might be a hose-pipe smooth inside where free motion is required, all to lead the grain Z down in and force it through the near end of the elevating main conduits C C' $C^2$ proper, which would preferably be formed with a large curved bend or knee upward at B in the long main vertical or preferably angled air-current grain-forcing column at C' of the conduits. Other branches $e^2$ and jet-nozzles $e$ $e'$, with controlling taps or valves $e^3$, as shown in detail in Fig. 17, may be fitted, also, at the upper and lower bends B' $B^2$ $B^3$ of the grain-pipes C C' $C^2$ $C^3$ to give an auxiliary jet of air in these pipes, so as to induce or draw the grain Z through them, (carried forward from the feeding in mouth-pieces A to $A^4$ and their air jet or jets,) and also draw and force the same along with the additional pressure of this jet of air right up the main forcing-trunk conduits C' C' to any height desired. These main grain lifting and forcing conduits C' $C^2$ $C^3$ are preferably made straight and cylindrical, of sheet metal, as shown; but they might be made of other sections, as square in wood, and be lined inside with sheet metal to protect the wood from wearing by the constant friction of the grain on its sides. At any or every flat or height G' $G^2$ $G^3$ of these main rising conduits C' C', where the grain has to be delivered horizontally along the flats, knees $B^3$ may be fitted; or sliding or other equivalent discharge branches—such as shown at M $m$ in Figs. 19 to 21—may be formed in their one side to direct the grain along the horizontal pipes $C^2$ $C^3$, and fitted with delivery or annular or curved chutes or branch pipes $m$ or $n$, with closing door $m^2$, Fig. 22, so that the grain blown and forced up to these pipes $C^2$ or $C^3$ would be discharged through the bend $n$ $n$ $n$, and, as indicated in the flat G' in Fig. 1, either with spreading-plates $n^3$ below the outlet, Fig. 22, or not, as desired. When it is desired to force or convey the grain delivered at these bends $B^3$ along at this height or level to the other parts of any one flat $G'$ $G^2$ $G^3$, then pipes $C^2$ $C^3$ $C^4$ or hose $C^5$, kept or fitted along the ceiling or on supports for the purpose, would be coupled to the knees $B^3$ $B^3$ on $M$ $m$, when these are employed, and an air-jet-nozzle branch $e$ might be here fitted for use, when required, and force the grain along these level pipes $C^3$ $C^4$ from the rising knee, as indicated at $B^3$ in flat $G^3$ in Fig. 1. In addition to fitting these delivery bends with air-pressure branches, we would for very high lifts have auxiliary annular air-jet nozzles $A^5$, branches $d^3$, and valves $d^4$, fitted at other intervals apart to assist in keeping up the suction and force and speed of the current of grain $Z$, through the main pipes or conduits $C$ to $C^4$, when this was found necessary, as indicated at $A^5$ in Fig. 1 and in detail in Fig. 18. In some cases, as with a very high pressure of air, the pipes and valves $d'$ and $d^3$ $d^4$, with the induction and forcing arrangements $A$ to $A^4$, may be fitted near the vertical elevating-pipes $C'$ $C'$, to produce such a vacuum and suction in the pipes or hose $C^2$ behind the nozzles as to draw in the grain at the admission-trumpet $H$ of the hose $C^2$ as will save the necessity of leading the air-pipes back along this induction-conduit to the grain; but when low pressures of air are used there would require to be more nozzle-jets, as $i$ $i'$ $i^2$, used in the grain induction and forcing apparatus $A'$ shown in Fig. 7, and also through the length of the grain-conduits at $A^5$ and $B'$ $B^2$ $B^3$ in Fig. 1. Where motion had to be given to both pipes $d'$ $C'$, (namely, as to the bends or knees $B$, or at the induction-nozzle ends $A$ to $A^4$,) they would both require to be coupled or connected by elastic hose $d^2$, or other equivalent movable telescopic and swiveling jointed pipes $C$ $C''$ and $B$ $g$, Fig. 14, as stated, all preferably with as few knees or bends $B$ $B'$ $B^2$ $B^3$ as possible, and where these are used they should have a good round curve in the bends to prevent the deposit of the grain at these points. They should also have auxiliary air-jets $e$ $e'$, supplied at $B'$, $B^2$, $B^3$, and $A^5$, as shown in Figs. 1 and $1^A$. Both the air-pipes $d'$ and grain-conduits $C$ would be made of any convenient sizes desired for the amount of grain to be raised in a given time; but, generally speaking, it would be better to have these pipes of moderate size, and when a greater amount of work had to be done rather to add to the number of the sets of these conduits $B$ $C$ and their corresponding air-pressure pipes $d'$ and their actuating-nozzle apparatus $A$ to $A^4$. Each set or range of conduits has a grain induction and forcing apparatus $A$ to $A^4$, which could be managed by one or two men, and for this purpose it might have wheels $h$ below, so as to be more easily moved on the floor-surface $z$ in front of the heap or bin of grain to be removed or raised.

Referring to Figs. 1, $1^A$, and 2, it will be observed that the horizontal grain-conducting pipes $C$, with the induction apparatus $A'$ and hopper $H'$, are shown as swiveling transversely on a joint at $g$ at the first bend $B$, connected with the upright pipes $C'$, passed up through the hatch-doors $X$ of the ship $S$ to the level of the quay $W$; but it will be understood that these might also be disposed and arranged to swivel in the longitudinal line of the ship and lengthened, all as particularly explained in reference to Figs. 14 to 16. The air-pressure pipes $d$ are led from the accumulator $D'$ of the engine $E$ $E'$ right along these grain-pipes $C$ $C'$ and carried on them by attachments $g^2$ to their flanges $c$ and jointed to pressure-hose at the bends $d^2$, where bending or yielding is required in the swiveling of the pipes $C$ below. Air-pressure pipes $d$ are also led up the side of the vertical pipes $C'$, within the granary $G$, to the auxiliary nozzles $A^5$ and $e$ $e'$ at the bends $B^3$, where required.

Referring to Fig. 3, a steam-barge $T$ is shown carrying all the air-forcing engines and machinery brought alongside the ship $S'$ to discharge the grain from it.

Referring to the arrangement shown on Sheets 4 and 5, this is very similar to that shown and described in reference to Sheets 1 to 3, and the parts lettered to correspond, except that the grain $Z$ is shown as being discharged from a grain-barge $S^3$ into a ship $S^2$, floating in harbor for loading it, the horizontal grain-pipe $C$, however, passing over the deck of the vessel $S^2$ from the barge $S^3$ and conducted along horizontal pipes $C^2$, fitted under the decks within the ship $S^2$ and let down into the several parts or divisions of the ship desired from lateral branches and doors, as shown at $n$ $n'$ in the flat $G'$ of the granary, Fig. 1; or it might be branches and doors—such as shown at $m$ $m'$ $m^2$ in Figs. 19 to 21—fitted with hose or other equivalents, as indicated at $l$ in the ship $S^2$, Fig. 4. When the grain has to be led forward instead of aft from the cross-pipes $C$, the branch bend $B'$ at the junction would be reversed, as dotted in at the hatchway $X'$. These pipes $C$ $C'$ might, however, be led direct down any one of the several hatchways $X$, when preferred, by merely moving the steamboat $T$ and grain-barge $S^3$ alongside the ship $S^2$ being loaded to the different positions for lowering the pipes.

We claim as our invention—

1. The combination of the grain-receptacle with a pneumatic grain-conveyer comprising a shifting and regulating central tapering nozzle with an outer nozzle or casing, leaving an annular opening for the admission of an annular jet of compressed air, a discharging-trumpet widening out from the annular air-opening, and piping leading from the widened end of the said trumpet, all substantially as described.

2. A pneumatic grain induction and forcing apparatus comprising the combination of a number of successive nozzles having chambers $a$ $a'$ $a^2$, communicating with each other, an air-supply pipe opening into the chamber $a$ a flaring grain-admission trumpet leading to the inner nozzle, and a flaring discharge-trumpet leading from the outermost nozzle, all substantially as described.

3. The combination of a series of shifting and regulating annular air-jet nozzles, each having an air-chamber $a$ and a valved supply branch $d^3$, with grain-piping, into which the said nozzles open, and air-supply piping, to which the said branches are connected, all substantially as described.

4. The combination of air and grain piping with annular air-jet nozzles I I' in the straight parts, combined with auxiliary air-jet nozzles $e$ at the bends B' in the piping, all substantially as described.

5. The combination of annular air-jet nozzles with grain-piping having shifting bends M, provided with opening and closing passages and valves $m'$ $m^2$ for delivering the grain laterally from the piping, all substantially as set forth.

In testimony whereof we have signed our names to this specification in the presence of two subscribing witnesses.

ANDREW BARCLAY.
JAS. WALKER.

Witnesses:
 WM. HENDERSON,
  Of Glasgow, Scotland, Writer.
 JAS. FORBES,
  Of Glasgow, Scotland, Law Clerk.